United States Patent [19]
Mink et al.

[11] Patent Number: 5,869,585
[45] Date of Patent: Feb. 9, 1999

[54] MULTI-COMPONENT CATALYST SYSTEMS FOR OLEFIN POLYMERIZATION

[75] Inventors: Robert I. Mink, Warren; Yury V. Kissin, East Brunswick, both of N.J.

[73] Assignee: Mobil Oil Corporation, Fairfax, Va.

[21] Appl. No.: 550,258

[22] Filed: Oct. 30, 1995

[51] Int. Cl.$^6$ ...................................................... C08F 4/18
[52] U.S. Cl. ...................... 526/129; 526/348.5; 526/352; 526/124.3; 502/111; 502/117; 502/120; 502/125
[58] Field of Search ...................... 526/161, 169, 526/169.2, 352, 129, 348.5, 124.3

[56] References Cited

U.S. PATENT DOCUMENTS

| | | | |
|---|---|---|---|
| 4,442,225 | 4/1984 | Takitani et al. | 502/112 |
| 4,452,914 | 6/1984 | Coleman, III et al. | 502/122 |
| 4,478,952 | 10/1984 | Mack et al. | 502/110 |
| 4,482,639 | 11/1984 | Desmond et al. | 502/117 |
| 4,555,497 | 11/1985 | Coleman, III et al. | 502/115 |
| 4,565,798 | 1/1986 | Yamamoto et al. | 502/119 |
| 4,622,309 | 11/1986 | Coleman, III et al. | 502/115 |
| 4,820,786 | 4/1989 | Bacskai | 526/152 |
| 5,043,408 | 8/1991 | Kakugo et al. | 526/347 |
| 5,086,135 | 2/1992 | Kissin | 526/151 |
| 5,166,281 | 11/1992 | Chamla et al. | 526/125 |
| 5,280,000 | 1/1994 | Kakugo et al. | 502/121 |
| 5,506,184 | 4/1996 | Kissin et al. | 502/115 |

*Primary Examiner*—David W. Wu
*Attorney, Agent, or Firm*—Dennis P. Santini

[57] ABSTRACT

Multi-component catalyst systems for polymerization and copolymerization of olefins consist of at least one transition metal complex containing a multidentate ligand and a three-component cocatalyst. The transition metal complexes with bidentate ligands L have empirical formulas $$LMX_2, LMXY \text{ or } L_2M$$

where M is Ti, V, Zr or Hf atom; X is an alkoxy group, an aryloxy group, or a halogen atom; Y is a mono- or double-bonded ligand different from X. Complexes with tridentate ligands L' have empirical formulas L'MX where M is Ti, V, Zr or Hf; X is an alkoxy group, an aryloxy group, or a halogen atom. Examples of L and L' are alkyldioxy, alkyldiamino, alkyldicarboxy, biaryldioxy, or alkylaminodioxy ligands; particular examples of X are the isopropoxy group or Cl; a particular example of Y is an oxygen atom. The preferred substitution types in the multidentate ligands L and L' are such which afford their unimpeded coordination to the metal atom M in tri-, tetra- or pentacoordinated complexes. The transition metal complexes can be used in pure state or supported on an inert carrier.

8 Claims, No Drawings

MULTI-COMPONENT CATALYST SYSTEMS FOR OLEFIN POLYMERIZATION

FIELD OF THE INVENTION

The invention relates to a catalyst composition for olefin polymerization which comprises a complex of a transition metal and a cocatalyst mixture effective to activate the complex.

The transition metal complex contains a multidentate ligand. The mixture effective to activate the complex is referred to as a cocatalyst and mixed cocatalyst interchangeably herein.

These catalyst systems exhibit very high activities in ethylene homopolymerization and ethylene-alpha olefin copolymerization reactions. In low pressure polymerization, the catalysts are effective at low temperatures. The catalyst can be also used for polymerization of higher alpha-olefins in high temperature polymerization reactions and for the synthesis of elastomers.

SUMMARY OF THE INVENTION

The invention is a polyolefin catalyst composition comprising:

A) a trialkylaluminum compound;
B) a halogenated organic compound containing a trihalogenated methyl group;
C) an organomagnesium compound of the formula RMgR' wherein each of R and R' is independently alkyl of 1 to 10 carbon atoms; and
D) a transition metal complex selected from the group consisting of transition metal complexes with bidentate ligands L, transition metal complexes with tridentate ligands L' and mixtures thereof.

The transition metal complexes with bidentate ligands L have an empirical formula:

$LMX_2$, $LMXY$ or $L_2M$ where M is Ti, V, Zr or Hf atom;
X is an alkoxy group, an aryloxy group, or a halogen atom;
Y is a mono- or double-bonded ligand different from X.
L is

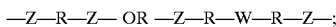

—Z—R—Z— OR —Z—R—W—R—Z—;

wherein Z is an oxygen atom, a sulfur atom, an N—H group or a C(=O)—O— group;
R is an aliphatic group, a cycloaliphatic group, or an aromatic group (unsubstituted or alkyl-substituted);
W is $CH_2$, O, S, N—R', or $SiR'_2$ where R' is an alkylene or an arylene group.

The transition metal complexes with tridentate ligands L' have empirical formulas L'MX where M is Ti, V, Zr or Hf; X is an alkoxy group, an aryloxy group, or a halogen atom; and L' is characterized by the general formula

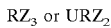

$RZ_3$ or $URZ_2$ where R is an aliphatic group, a cycloaliphatic or an aromatic group; and each of Z and U is the same or different and is selected from the group consisting of an oxygen atom, a sulfur atom, an N—H group or a C(=O)—O— group.

These catalyst compositions exhibit good activity under low pressure olefin polymerization conditions. Preferably, polymerization of ethylene alone or in the presence of an alpha-olefin is undertaken in accordance with the invention.

DETAILED DESCRIPTION OF THE INVENTION

The invention is a polyolefin catalyst composition comprising

A) a trialkylaluminum compound;
B) a halogenated organic compound containing a trihalogenated methyl group;
C) an organomagnesium compound of the formula RMgR' wherein each of R and R' is independently alkyl of 1 to 10 carbon atoms; and
D) a transition metal complex selected from the group consisting of transition metal complexes with bidentate ligands L, transition metal complexes with tridentate ligands L' and mixtures thereof.

The three components of the catalyst composition of the invention, including a trialkylaluminum compound [A], an organomagnesium compound [C] and a halogen-containing compound [B] constitute a mixed cocatalyst for activating the transition metal complex [D]. The mixed cocatalyst is used in an amount to provide a molar ratio of the transition metal in [D] to aluminum in the cocatalyst mixture of 1:1 to 1:10,000. The trialkylaluminum compound can contain alkyl groups of 1 to 10 carbon atoms. Particular examples of the trialkylaluminum compounds in the cocatalyst mixture are triethylaluminum, trimethylaluminum and triisobutylaluminum.

The organomagnesium compound has the empirical formula $R_mMgR'_n$ where R and R' are the same or different $C_1$–$C_{12}$ alkyl groups. Each of R and R' may be selected from the group consisting of methyl, ethyl, propyl, isoporpyl, butyl, sec-butyl, tert-butyl, pentyl (branched or linear), hexyl (branched or linear), or octyl (branched or linear) groups. Preferably R and R' are $C_4$–$C_{10}$ alkyl groups, more preferably $C_4$–$C_8$ normal alkyl groups, and most preferably both R and R' are n-butyl groups, and m and n are each 0, 1 or 2, providing that m+n is equal to the valence of Mg. Particular examples of organomagnesium compounds are dibutylmagnesium and dihexylmagnesium.

The halogen-containing compound has the formula $CX_3X'$ in which X is a halogen atom, preferably chlorine or bromine; and X' is either a halogen atom, preferably chlorine or bromine, or an alkyl group of 1 to 5 carbon atoms. Particular examples of halogen-containing compounds include carbon tetrachloride, carbon tetrabromide and 1,1,1-trichloroethane. The molar ratio of an organomagnesium compound to a trialkylaluminum compound ranges from 0.01 to 100. The molar ratio of the halogen-containing compound in the cocatalyst system ranges from 0.01 to 1000 with respect to the organomagnesium compound.

The three components [A], [B] and [C], of the mixed cocatalyst may be contacted with [D] prior to introduction of the catalyst composition into the reactor or after introduction of [D] into the reactor. These components may be contacted in any order. In preferred embodiments below, the trialkylaluminum compound is added to a mixture of the organomagnesium compound and the halogenated compound prior to introduction of the transition metal complex; in these embodiments the mixture of organomagnesium compound and halogenating compound are contacted at elevated temperatures, above ambient and less than 90° C.

The transition metal complex [D] contains a bidentate ligand or a tridentate ligand. The transition metal complexes with bidentate ligands L have an empirical formula:

$LMX_2$, LMXY or $L_2M$.

In the empirical formula, M is Ti, V, Zr or Hf atom. Each of X and Y is different and may be selected from the group consisting of alkoxy or aryloxy groups or a halogen atom. The alkoxy group may have 1 to 6 carbon atoms, and can be selected from the group consisting of methoxy, ethoxy, propoxy, isopropoxy, butoxy, i-butoxy, t-butoxy group. The aryloxy group may be a phenoxy, alkylphenoxy, arylphenoxy, naphthoxy, alkylnapthoxy or arylhaphthoxy group. The halogen atom X may be a fluorine, chlorine, bromine or iodine atom, but preferably is the chlorine atom. Y is a mono- or double-bonded ligand different from X, such as a halogen atom or an oxygen atom.

L is a bidentate ligand

—Z—R—Z— OR —Z—R—W—R—Z— wherein Z is an oxygen atom, a sulfur atom, an N—H group or a C(=O)—O— group;

R is an aliphatic group of 1 to 10 carbon atoms, a cycloaliphatic group of 5 to 8 carbon atoms, or an aromatic group (unsubstituted or alkyl-substituted);

W is $CH_2$, O, S, N—R', or $SiR'_2$ where R' is an alkyl or an aryl group of 1 to 6 carbon atoms.

The transition metal complexes with tridentate ligands L' have empirical formulas L'MX where M is Ti, V, Zr or Hf atoms; X is an alkoxy group, an aryloxy group or a halogen atom as defined above; and L' is a tridentate ligand characterized by general formulas $RZ_3$ or $URZ_2$ where R is an aliphatic group of 3 to 10 carbon atoms, a cycloaliphatic group of 5 to 8 carbon atoms, or an aromatic group (unsubstituted or alkyl-substituted) and each of Z and U is the same or different and is selected from the group consisting of an oxygen atom, a sulfur atom, an N—H group or a C(=O)—O— group.

The transition metal complex [D] can be synthesized in the presence of a carrier, or preferably it can be formed in a solvent and deposited on a carrier. Any one of components [A], [B], or [C] can be supported on a carrier, individually, or in admixture, with or without [D]. The transition metal complexes are formed by contact and reaction of a transition metal compound with a source of the ligand L or L'. The contact between the transition metal compound and the source of the ligand L or L' is carried out in a solvent at ambient or elevated temperature, 0° to 100° C., under inert conditions. The preferred solvent is a polar solvent such as tetrahydrofuran.

Suitable transition metal compounds used as reactants herein are compounds of metals of Groups IVA, VA, VIA or VIII of the Periodic Chart of the Elements, as published by the Fisher Scientific Company, Catalog No. 5-702-10, 1978, providing that such compounds are soluble in the polar solvents. Non-limiting examples of such compounds are titanium and vanadium halides, e.g., titanium tetrachloride, vanadium tetrachloride, vanadium oxytrichloride, titanium and vanadium alkoxides, wherein the alkoxide moiety has a branched or unbranched alkyl radical of 1 to about 20 carbon atoms, preferably 1 to about 6 carbon atoms. Specific transition metal compounds include titanium tetraisopropoxide; titanium tetrachloride; zirconium tetraisopropoxide; vanadyl triisopropoxide. The preferred transition metal compounds are titanium compounds, preferably tetravalent titanium compounds. The most preferred titanium compounds are titanium tetraisopropoxide and titanium tetrachloride.

Mixtures of such transition metal compounds may also be used and generally no restrictions are imposed on the transition metal compounds which may be included. Any transition metal compound that may be used alone may also be used in conjunction with other transition metal compounds.

The preferred substitution types in the multidentate ligands L and L' are such which afford their unimpeded coordination to the metal atom M. Particular examples of L and L' are alkyldioxy, alkyldiamino, alkyldicarboxy, biaryldioxy, biaryldicarboxy or alkylaminodioxy ligands, in which the alkyl groups contain 2 to 6 carbon atoms. Specific ligands L or L' are derived from 1,2,6-hexanetriol; 1,5-hexanediol; diglycolic acid; camphoric acid; 2-hydroxybenzyl alcohol; 1,1'-bi-2-naphthol; bis(2-hydroxyphenyl)methane; 2,2'-biphenol; diphenic acid; cis-1,2-diaminocyclohexane; 1,4,7-triazacyclononane; diethanolamine; L-glutamic acid; 1-[N,N-bis(2-hydroxyethyl)amino]-2-propanol.

The catalyst precursors [D] used in the present invention are prepared in the substantial absence of water, oxygen, and other catalyst poisons. Such catalyst poisons can be excluded during the catalyst preparation steps by any well known methods, e.g., by carrying out the preparation under an atmosphere of nitrogen, argon or other inert gas. An inert gas purge can serve the dual purpose of excluding external contaminants during the preparation and removing undesirable reaction by-products resulting from the preparation of the neat, liquid reaction product. Purification of the solvent employed in the catalyst is also helpful in this regard. The recovery of the transition metal complex comprises removing solvent at temperatures of 20° to 100° C., preferably 40° to 80° C. Removal of solvent can be by evaporation.

The complexes containing bidentate and tridentate liquids are crystalline solids or heavy viscous liquids. Each complex, depending on the type of the transition metal, the multidentate ligand and the complex composition, has a particular color. The complexes were characterized by their infrared spectra, as shown in the examples below.

The transition metal complexes containing multidentate ligands can be used in a pure state or supported on inert carriers. If supported, the production of the catalyst composition may be formed by various sequences of steps. Preferably, the supported catalyst may contain the transition metal complex, deposited or impregnated on an inert porous support, which is subsequently contacted with the mixed cocatalyst, prior to or after introduction into the polymerization reactor.

The preferred carrier material is a solid, particulate, porous, preferably inorganic material which is inert to the other components of the catalyst composition and to the other active components of the reaction system. These materials include inorganic materials, such as oxides of silicon and/or aluminum and/or magnesium, such as silica, alumina, silica/alumina or MgO. The amount of transition metal on the carrier can range from 0.01 to 10 mmol/g carrier. The carrier material is used in the form of a dry powder having an average particle size of from about 1 micron to about 250 microns, preferably from about 10 microns to about 150 microns. The preferred carrier material is porous and has a specific surface area of at least about 3 $m^2/g$, and preferably at least about 50 $m^2/g$. The carrier material should be free of absorbed water. When the carrier is silica, it is heated at least 200° C., preferably about 200° C. to about 850° C. and most preferably at about 600° C.

The silica is in the form of spherical particles, e.g., as obtained by a spray-drying process.

The carrier material is slurried in a polar solvent and the resulting slurry is contacted with a solution of at least one complex [D]. Polar solvents used in the production of the transition metal complex [D] can also be employed for impregnation.

After the contact with the carrier, the solvent is slowly removed by distillation or evaporation. It is preferred to remove the solvent at about 40° to about 65° C.

Polymerization

The catalyst systems comprising the transition metal complex [D] and the cocatalyst system [A]+[B]+[C] are used in ethylene homopolymerization and ethylene-alpha-olefin copolymerization reactions. The reactions can be conducted in the gas phase, in solution or in a slurry at conventional polymerization pressures. Polymerization temperatures can range from 0° C. to 300° C., pressures ranging from 100,000 to 10 psi.

The molecular weight of the polymers may be controlled by using hydrogen.

The molecular weight distribution of the polymers prepared in the presence of the catalysts of the present invention, as expressed by the MFR values, varies from about 20 to about 35, preferably about 20 to about 30.

MFR is defined herein as the ratio of the high load melt index (HLMI or $I_{21.6}$ divided by the melt index ($I_{2.16}$), i.e., $$MFR = \frac{I_{21.6}}{I_{2.16}}$$

Ethylene polymers prepared in accordance with the present invention are homopolymers of ethylene or copolymers of ethylene with one or more $C_3$-$C_{10}$ alpha-olefins. Thus, copolymers having two monomeric units are possible as well as terpolymers having three monomeric units. Particular examples of such polymers include ethylene/1-butene copolymers, ethylene/1-hexene copolymers, ethylene/1-octene copolymers, ethylene/4-methyl/1-pentene copolymers, ethylene/1-butene/1-hexene terpolymers, ethylene/propylene/1-hexene terpolymers and ethylene/propylene/1-butene terpolymers.

The linear low density polyethylene polymers produced in accordance with the present invention preferably contain at least about 80 percent by weight of ethylene units.

The following examples further illustrate the essential features of the invention. However, it will be apparent to those skilled in the art that the specific reactants and reaction conditions used in the Examples do not limit the scope of the invention.

EXAMPLES

All catalyst syntheses were carried out in dried solvents under nitrogen atmosphere. Polymerization experiments were carried out in two different stainless-steel reactors, with volumes of 0.5 and 1.6 liters, respectively. Each autoclave was equipped with a stirrer, a thermocouple and several ports for adding reaction components. The reactors were purged with nitrogen flow at 100° C. for 1 hour before polymerization experiments. All solvents and monomers used in polymerization reaction were deoxygenated and dried prior to use.

Example 1

(A) Synthesis of a 1:1 Complex From 2,2-biphenol and Titanium Tetraisopropoxide 2,2-biphenol (0.192 g, 1.0 mmol) was dissolved in 10 cc of THF at 25° C. Ti(Oi—Pr)$_4$, (0.30 cc, 1.0 mmol) was added to the solution, the mixture was stirred at 55° C. for 2 hours and then the solvent was removed by evaporation at 55°–60° C. The residue is a glossy brown-yellow solid.

(B) Copolymerization 0.5-liter reactor was filled with 200 cc of n-heptane and 50 cc of 1-hexene. The catalyst components were added to the autoclave in the following sequence: (a) 0.230 g of carbon tetrabromide dissolved in 5 cc of n-heptane; (b) 1.0 cc of 0.7 mol/l solution of Mg(C$_4$H$_9$)$_2$ in heptane, after which the autoclave was heated to 70° C.; (c) 1.0 cc of 1.44 mol/l solution of Al(CH$_3$)$_3$ in hexane; (d) 2 cc of the toluene solution of the complex of Example 1-A containing 2.86–10$^{-3}$ mmol Ti. Ethylene was admitted to the autoclave to maintain a total pressure of 120 psig. The polymerization reaction was carried out for 140 min. to yield 8.0 g of high molecular weight ethylene-hexene copolymer containing 1.4 mol. % of hexene. The catalyst productivity is 2,800 g/mmol Ti.

(C) Copolymerization 0.5-liter reactor was filled with 200 cc of n-heptane and 50 cc of 1-hexene. The catalyst components were added to the autoclave in the following sequence: (a) 0.230 g of carbon tetrabromide dissolved in 5 cc of n-heptane; (b) 1.0 cc of 0.7 mol/l solution of Mg(C$_4$H$_9$)$_2$ in heptane, after which the autoclave was heated to 80° C.; (c) 1.0 cc of 1.44 mol/l solution of Al(CH$_3$)$_3$ in hexane; (d) 5 cc of the toluene solution of the complex of Example 1-A containing 2.85–10$^{-3}$ mmol Ti. Ethylene was admitted to the autoclave to maintain a total pressure of 180 psig. The polymerization reaction was carried out for 30 min. to yield 17.9 g of high molecular weight ethylene-hexene copolymer containing 1.0 mol. % of hexene. The catalyst productivity is 6,300 g/mmol Ti.

Example 2

(A) Synthesis of a 1:1 Complex From 2,2'-diphenic Acid and Titanium Tetraisopropoxide 2,2'-diphenic acid (0.242 g, 1.0 mmol) was dissolved in 2.5 cc of THF at 25° C. Ti(Oi—Pr)$_4$ (0.33 cc, 1.1 mmol) was added to the solution, the mixture was stirred at 55° C. for 30 min and then the solvent was removed by evaporation at 55°–60° C. The residue was white solid (0.690 g recovered) readily soluble in toluene.

(B) Copolymerization 0.5-liter reactor was filled with 200 cc of n-heptane and 50 cc of 1-hexene. The catalyst components were added to the autoclave in the following sequence: (a) 0.230 g of carbon tetrabromide dissolved in 5 cc of n-heptane; (b) 1.0 cc of 0.7 mol/l solution of Mg(C$_4$H$_9$)$_2$ in heptane, after which the autoclave was heated to 70° C.; (c) 1.0 cc of 1.44 mol/l solution of Al(CH$_3$)$_3$ in hexane; (d) 0.5 cc of the toluene solution of the complex of Example 2-A containing 1.84–10$^{-3}$ mmol Ti. Ethylene was admitted to the autoclave to maintain a total pressure of 120 psig. The polymerization reaction was carried out for 130 min. to yield 43.3 g of high molecular weight ethylene-hexene copolymer containing 2.0 mol. % of hexene. The catalyst productivity is 23,500 g/mmol Ti.

Example 3

(A) Synthesis of a Supported Catalyst Containing an 1:1 Complex From 2,2'-biphenol and Vanadyl Triisopropoxide 2,2'-biphenol (0.186 g, 1.0 mmol) was dissolved in 5 cc of THF at 25° C. Vanadyl triisopropoxide, V(=O)(Oi—Pr)$_3$ (0.242 cc, 1.0 mmol) was added to the solution, the mixture was stirred at 55° C. for 2 hours and then the solvent was removed by evaporation at 55°–60° C. The residue is a black tar readily soluble in toluene. 0.099 g of the residue was dissolved in 4 cc of THF and mixed with 0.50 g of dry silica (Davison 955–600, calcined at 600° C. in nitrogen for 16 h and treated with Al(C$_2$H$_5$)$_{33}$ at the Al:SiO$_2$ ratio of 0.72 mmol/g. THF was removed in a stream of dry nitrogen and a gray solid (0.425 g) was recovered.

(B) Copolymerization 0.5-liter reactor was filled with 200 cc of n-heptane and 50 cc of 1-hexene. The catalyst components were added to the autoclave in the following sequence: (a) 0.230 g of carbon tetrabromide dissolved in 5 cc of n-heptane; (b) 1.0 cc of 0.7 mol/l solution of Mg(C$_4$H$_9$)$_2$ in heptane, after which the autoclave was heated to 70° C.; (c) 1.0 cc of 1.44 mol/l solution of Al(CH$_3$)$_3$ in hexane; (d) 0.0323 g of the catalyst of Example 3-A. Ethylene was admitted to the autoclave to maintain a total pressure of 120 psig. The polymerization reaction was carried out for 60 min. to yield 15.7 g of high molecular weight ethylene-hexene copolymer containing 6.0 mol. % of hexene.

Example 4

(A) Synthesis of Catalyst Containing a 1:1 Complex From 2,2'-biphenol and Titanium Tetrachloride 2,2'-biphenol (0.929 g, 4.98 mmol) was dissolved in 100 cc of THF at 25° C. and heated to 55° C. Titanium tetrachloride, TiCl$_4$ (1.48 cc of 3.37M solution in heptane, 5.0 mmol) was added to the solution which was then stirred at 55° C. for 40 min. 5.0 g of silica (Davison 955–600, calcined at 600° C. in nitrogen for 16 h) was added to the solution, it was stirred for 1 h and then the solvent was removed by evaporation at 55°–60° C.

(B) Copolymerization 1.6-liter reactor was filled with 750 cc of n-heptane and 60 cc of 1-hexene. The catalyst components were added to the autoclave in the following sequence: (a) 4.1 cc of 0.74 mol/l solution of Mg(C$_4$H$_9$)$_2$ in heptane; (b) 0.58 cc of neat carbon tetrachloride; (c) 4.2 cc of 1.44 mol/l solution of Al(CH$_3$)$_3$ in heptane, after which the autoclave was heated to 80° C.; (d) 0.033 g of the catalyst of Example 4-A. Ethylene was admitted to the autoclave to maintain a total pressure of 45 psig. The polymerization reaction was carried out for 60 min. to yield 22.0 g of ethylene-hexene copolymer containing 4.2 mol. % of hexene. The resin has an I$_{21}$ value of 10.8; it has two components with melting points of 106.1° and 124.1° C.

(C) Copolymerization 1.6-liter reactor was filled with 750 cc of n-heptane and 60 cc of 1-hexene. The catalyst components were added to the autoclave in the following sequence: (a) 4.1 cc of 0.74 mol/l solution of Mg(C$_4$H$_9$)$_2$ in heptane; (b) 0.60 cc of neat 1,1,1-trichloroethane; (c) 4.2 cc of 1.44 mol/l solution of Al(CH$_3$)$_3$ in heptane, after which the autoclave was heated to 80° C.; (d) 0.031 g of the catalyst of Example 4-A. Ethylene was admitted to the autoclave to maintain a total pressure of 65 psig. The polymerization reaction was carried out for 60 min. to yield 5.4 g of ethylene-hexene copolymer.

(D) Copolymerization 0.5-liter reactor was filled with 200 cc of n-heptane and 50 cc of 1-hexene. The catalyst components were added to the autoclave in the following sequence: (a) 1.0 cc of 0.7 mol/l solution of Mg(C$_4$H$_9$)$_2$ in heptane; (b) 1.0 cc of 1.5 mol/l solution of Al(CH$_3$)$_3$ in hexane, after which the autoclave was heated to 70° C.; (c) 0.303 g of the catalyst of Example 4-A; (d) 0.230 g of carbon tetrabromide dissolved in 5 cc of n-heptane. Ethylene was admitted to the autoclave to maintain a total pressure of 120 psig. The polymerization reaction was carried out for 45 min. to yield 37.6 g of high molecular weight ethylene-hexene copolymer containing 4.8 mol. % of hexene.

Thus it is apparent that there has been provided, in accordance with the invention, a catalyst system, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A process for polymerizing olefins comprising contacting a feed comprising ethylene, under ethylene polymerization conditions, with a catalyst comprising A) a trialkylaluminum compound;

B) a halogenated organic compound containing a trihalogenated methyl group;

C) an organomagnesium compound of the formula RMgR' wherein each of R and R' is independently alkyl of 1 to 10 carbon atoms; and D) a complex which is a 1:1 molar ratio reaction product of diphenic acid and titanium tetraisopropoxide.

2. The process of claim 1 wherein D is supported on silica.

3. The process of claim 1 wherein the halogenated organic compound is carbon tetrabromide.

4. The process of claim 1 wherein the feed further comprises hexene.

5. A process for polymerizing olefins comprising contacting a feed comprising ethylene, under ethylene polymerization conditions, with a catalyst comprising A) a trialkylaluminum compound;

B) a halogenated organic compound containing a trihalogenated methyl group;

C) an organomagnesium compound of the formula RMgR' wherein each of R and R' is independently alkyl of 1 to 10 carbon atoms; and D) a complex which is a 1:1 molar ratio reaction product of titanium tetraisopropoxide and a compound selected from the group consisting of 1,2,6-hexanetriol and 1,5-hexanediol.

6. The process of claim 5 wherein D is supported on silica.

7. The process of claim 5 wherein the halogenated organic compound is carbon tetrabromide.

8. The process of claim 5 wherein the feed further comprises hexene.

* * * * *